United States Patent [19]

Lim

[11] Patent Number: 5,564,811
[45] Date of Patent: Oct. 15, 1996

[54] OPTICAL PROJECTION SYSTEM WITH A VARIFOCAL PROJECTION LENS

[75] Inventor: Dae-Young Lim, Seoul, Rep. of Korea

[73] Assignee: Daewoo Electronics Co., Ltd., Seoul, Rep. of Korea

[21] Appl. No.: 367,527

[22] Filed: Dec. 30, 1994

[30] Foreign Application Priority Data

Jan. 18, 1994 [KR] Rep. of Korea .................... 94-786

[51] Int. Cl.⁶ .................................................. G03B 21/28
[52] U.S. Cl. ........................................... 353/99; 353/101
[58] Field of Search .............................. 353/97, 99, 101, 353/102, 122; 348/770, 771, 755; 359/223, 224, 850, 851

[56] References Cited

U.S. PATENT DOCUMENTS

| | | | |
|---|---|---|---|
| 3,504,117 | 3/1970 | Dueringer | 348/770 |
| 3,989,890 | 11/1976 | Nathanson et al. | 348/771 |
| 4,111,538 | 9/1978 | Sheridon | 353/122 |
| 5,108,172 | 4/1992 | Flasck | 353/31 |
| 5,245,369 | 9/1993 | Um et al. | 353/122 |
| 5,260,798 | 11/1993 | Um et al. | 348/770 |
| 5,283,599 | 2/1994 | Tejima et al. | 353/101 |
| 5,379,081 | 1/1995 | Kim et al. | 353/99 |

Primary Examiner—William Dowling
Attorney, Agent, or Firm—Anderson, Kill & Olick P.C.

[57] ABSTRACT

An optical projection system capable of displaying an image of M×N pixels in various sizes, wherein M and N are integers, comprises an non-point light source, a collimating lens, a focussing lens, an optical baffle, an array of M×N actuated mirrors, and a varifocal projection system including a positive power lens and a negative powers lens separated by a distance, wherein the image in various sizes is provided by changing the distance between the positive and negative power lenses in the varifocal projection lens system.

2 Claims, 2 Drawing Sheets

OPTICAL PROJECTION SYSTEM WITH A VARIFOCAL PROJECTION LENS

FIELD OF THE INVENTION

The present invention relates to an optical projection system; and, more particularly, to an optical projection system capable of displaying an image in various sizes on a projection screen by incorporating therein a varifocal projection lens system.

BACKGROUND OF THE INVENTION

Among the various video display systems available in the art, an optical projection system is known to be capable of providing high quality images in a large scale.

In FIG. 1, there is illustrated a prior art optical projection system 100 comprising a non-point light source 1, an optical baffle 2 provided with a plurality of reflective surfaces and corresponding number of slits, an array 3 of M×N actuated mirrors 4, a focussing, a projection and a collimating lenses 6,7,8, and a projection screen 9. Such an optical projection system is more fully described in a commonly assigned U.S. Pat. No. 5,379,081 entitled "Optical Baffling Device" and is incorporated by reference herein. In such a system, light emanating from the non-point light source 1 is focussed along a first optical light path 10 onto the reflective surfaces of the optical baffle 2 by the focussing lens 6. The reflective surfaces of the optical baffle 2 are in a facing relationship with the focussing lens 6 and the collimating lens 8. The light beam reflected from each of the reflective surfaces diverges along a second optical path 11 and quasi-collimated by the collimating lens 8, thereby being uniformly illuminated onto the array 3 of M×N actuated mirrors 4, each of the actuated mirrors 4 corresponding to each of the pixels to be displayed. The optical path of the reflected light from each of the actuated mirrors 4 is determined by the amount of deflection thereof. The reflected light beam from each of the undeflected actuated mirrors are focussed back to the optical baffle 2 by the collimating lens 8 along a second optical path 11 and stopped by the reflective surfaces thereof, whereas the reflected light beams from each of the deflected actuated mirrors are focused by the collimating lens 8 along a third optical path 12 so that a portion of the focused light beam passes though the slits thereof. The light beams from each of the actuated mirrors 4 which pass through the slits are transmitted to the projection lens 7 which focuses the transmitted light beam from each of the actuated mirrors 4 on the projection screen 9, thereby displaying each of the pixels corresponding thereto.

One of the major drawbacks of the above-described optical projection system is that it lacks means for providing the image in various sizes, and to an certain extent, the size of the overall system, which is predetermined, among others, by the focal length of the projection lens.

SUMMARY OF THE INVENTION

It is, therefore, a primary object of the present invention to provide an optical projection system capable of providing an image in various sizes.

In accordance with the present invention, there is provided an optical projection system capable of displaying an image of M×N pixels in various screen sizes, wherein M and N are integers, comprising: a non-point light source for emitting light beams; an array of M×N actuated mirrors, each of the actuated mirrors including an actuator and a mirror; a focussing lens including a focal length and a corresponding focal point; a collimating lens; an optical baffle provided with a plurality of reflective surfaces and slits, wherein the reflective surfaces are located at the focal point of the focussing lens and are in a facing relationship with the focussing lens and the collimating lens; a projection screen for displaying the image; a varifocal projection lens system including a positive power lens and a negative power lens, each of the power lenses being provided with a center point and a corresponding focal point, the varifical projection lens system having a focal length when the center points of the power lenses are separated by a distance, wherein the focussing lens is used for focussing the light beams emanating from the light source along a first optical path onto the reflective surfaces of the optical baffle located on its focal point; the reflective surfaces of the optical baffle for reflecting and diverging the light beams along a second optical path, the collimating lens for collimating the reflected beams from the reflective surfaces of the optical baffle to thereby illuminate the collimated beams uniformly onto each of the mirrors in the array of M×N actuated mirrors; each of the mirrors in the array of M×N actuated mirrors for reflecting the collimated light beams from the collimating lens and also causing a deviation in the optical path thereof reflected from each of the mirrors in the array of M×N actuated mirrors by changing its relative position to the collimated light beams in response to an electrical signal applied to the corresponding actuator; the collimating lens for refocussing the reflected light beams from each of the mirrors in the array of M×N actuated mirrors onto the reflective surfaces and slits of the optical baffle to thereby allow the optical baffle to modulate the intensity of the light beams; the varifocal projection lens for focussing onto the projection screen the modulated light beams from the optical modulator at a varying focal length by changing the distance between the center points of the positive and negative power lenses to thereby allow said optical system to display the image of M×N pixels in various sizes.

BRIEF DESCRIPTION OF THE DRAWINGS

The present invention together with the above and other objects and advantages will become apparent from the following description of preferred embodiments given in conjunction with the accompanying drawings, wherein.

DETAILED DESCRIPTION OF THE PREFERRED EMBODIMENTS

Figure 1:
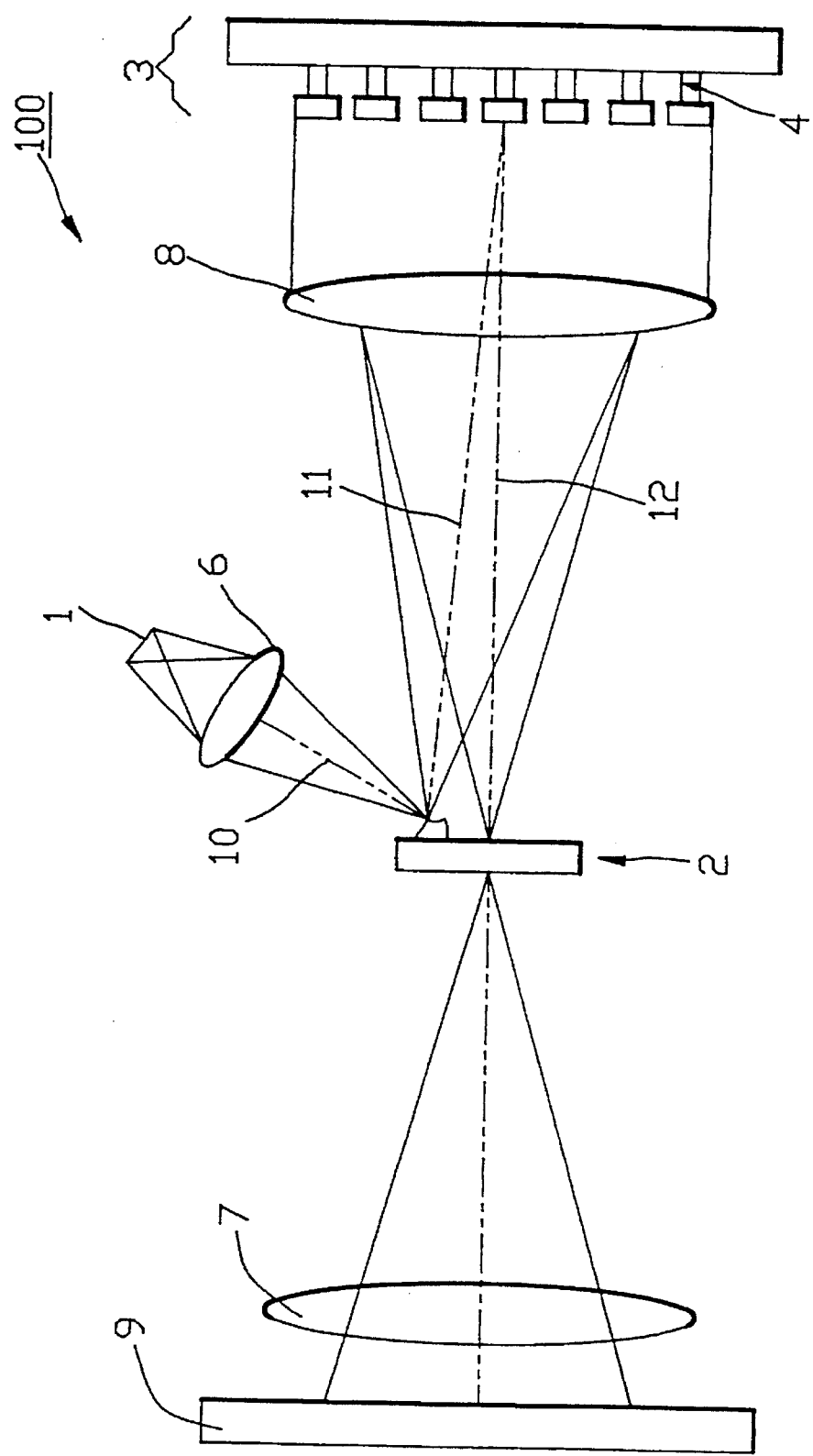
FIG. 1 represents a schematic view of a prior art optical projection system.
Figure 2:
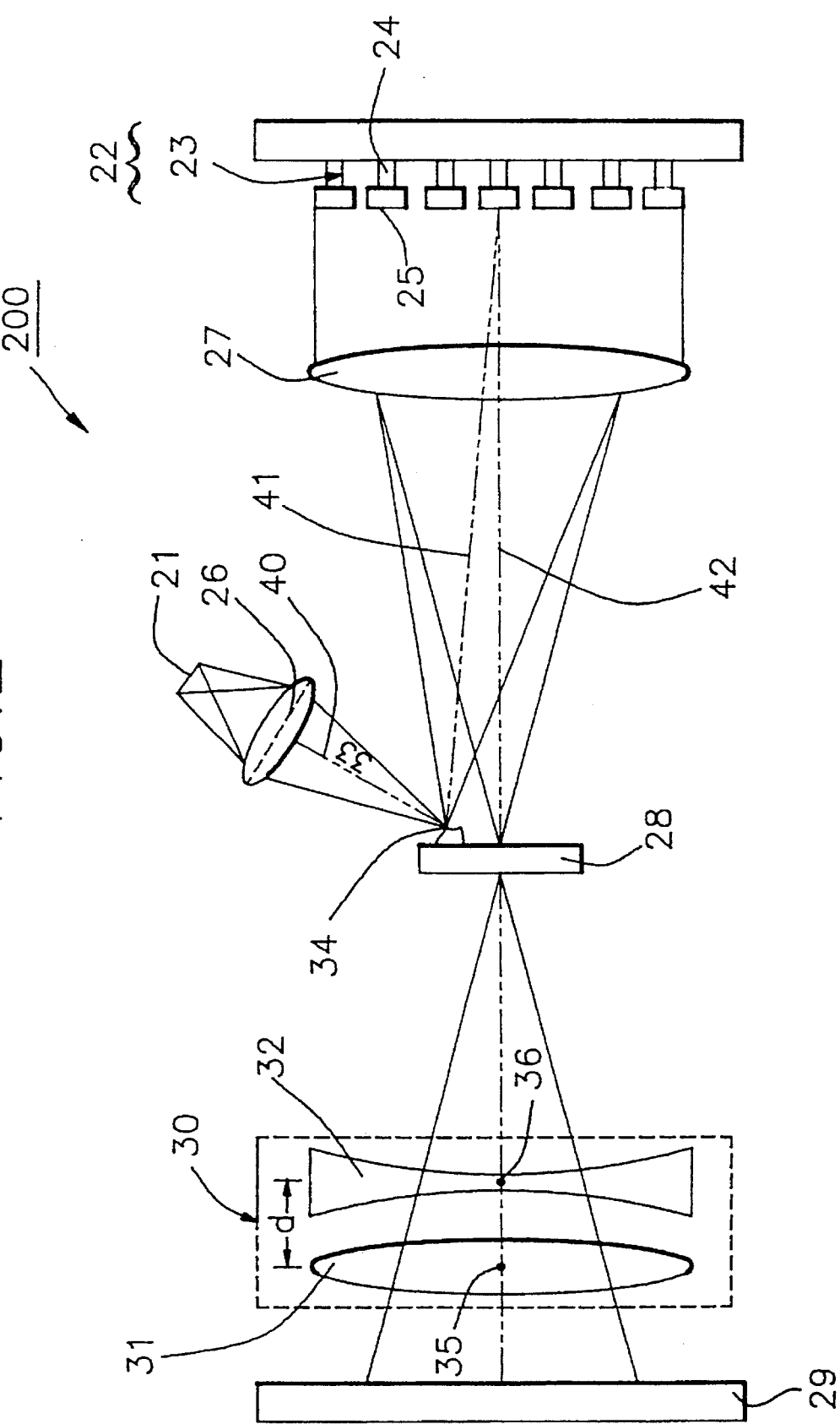
FIG. 2 illustrates a schematic view of an optical projection system in accordance with a preferred embodiment of the present invention.

There is illustrated in FIG. 2 a schematic view of an optical projection system 200 in accordance with the preferred embodiment of the present invention comprising a non-point light source 21, an array 22 of M×N actuated mirrors 23, each of the actuated mirrors 23 having an actuator 24 and a mirror 25, a focussing lens 26, a collimating lens 27, an optical baffle 28, a projection screen 29 and a varifocal projection lens system 30 provided with a positive (+) power lens 31 and a negative(−) power lens 32.

The focussing lens 26 is provided with a focal length 33 and a corresponding focal point 34, and the optical baffle 28, with a plurality of reflective surfaces and slits, wherein the reflective surfaces of the optical baffle 28 are located at the focal point 34 of the focussing lens 26 and are in a facing relationship with the focussing lens 26 and the collimating lens 27. Each of the power lenses 31, 32 includes a center point, 35,36.

Light beams emanating from the non-point light source 21 are focussed onto the reflective surfaces of the optical baffle 28 by the focussing lens 26 along a first optical path 40. The reflective surfaces of the optical baffle 28, being in the facing relationship with the focussing lens 26 and the collimating lens 27, reflect and diverge the light beams along a second optical path 41 onto the collimating lens 27, which in turn, collimate the reflected light beams from the reflected surfaces of the optical baffle 28 to thereby illuminate uniformly the reflected light beams onto the array 22 of M×N actuated mirrors 23, each of the actuated mirrors 23 corresponding to each of the pixels to be displayed.

The actuators 24 are made of an electrodisplacive material such as a piezoelectric or an electrostrictive material which deforms in response to an electrical signal applied thereto.

The optical path of the reflected light beam from each of the actuated mirrors 23 is determined by the amount of deflection thereof. Each of the mirrors 25 in the array 22 is in an optical alignment with the reflective surfaces of the optical baffle 28. By applying an electrical signal to each of the actuators 24, the relative position of each of the actuators 24, and hence, the relative position of each of the mirrors 25, to the incident beam is altered, thereby causing a deviation of the optical path of the reflected light beam from the each of the mirrors 25. The reflected light beam from each of the undeflected actuated mirrors are focussed back to the reflective surfaces of the optical baffle 28 by the collimating lens 27 along the second optical path 41, whereas the reflected light beam from each of the deflected actuated mirrors are focussed by the collimating lens 27 along a third optical path 42 so that a portion of the focussed light beam passes through the slits thereof. In other words, as the optical path for each of the reflected light beams is varied across the reflective surfaces and the slits of the optical baffle 28, the amount of light reflected from each of the mirror 25 which passes through the slits of the optical baffle 28 is changed, thereby allowing the optical baffle 28 to modulate the intensity of the beam.

In forming the image of M×N pixels on the projection screen 29, the modulated light beams from the optical baffle 28 are focussed onto the projection screen 29 by the varifocal projection lens 30, including the positive and negative power lenses 31, 32. By incorporating the varifocal projection lens system 30 in the optical projection system 200, it is possible to display the image in various sizes by changing the focal length of the varifocal projection lens system 30, and this can be achieved by changing the separation distance between the respective center points 35, 36 of the power lenses 31, 32.

As shown in FIG. 2, if the system focal length of the varifocal projection lens system 30 is f when the center points 35,36 are separated by the distance d, then, in obtaining a focal length greater than f, the center points 35,36 of the power lenses 31,32 must be moved closer together, and in obtaining a focal length less than f, the center points 35,36 thereof must be moved further away from each other.

The relationship between the system focal length f and the separation distance d between the center points 35,36 of the power lenses 31,32 can be expressed using the following equation:

$$f = \frac{f_1 \cdot f_2}{f_1 + f_2 - d}$$

wherein $f_1$ is a focal length of the positive power lens 31, $f_2$ is a focal length of the negative power lens 32.

In conjunction with the varifocal projection lens system 30, it should be mentioned that the varifocal projection lens system 30 can be made of a plurality of positive power and negative power lenses in providing the variable focal length.

While the present invention has been described with respect to certain preferred embodiments only, other modifications and variations may be made without departing from the scope of the present invention as set forth in the following claims.

What is claimed is:

1. An optical projection system capable of providing an image of M×N pixels in various sizes, wherein M and N are integers, comprising:

a non-point light source for emitting light beams;

an array of M×N actuated mirrors, each of the actuated mirrors including an actuator and a mirror;

a focussing lens including a focal length and a corresponding focal point;

a collimating lens;

an optical baffle provided with a plurality of reflective surfaces and slits, wherein the reflective surfaces are located at the focal point of the focussing lens and are in a facing relationship with the focussing lens and the collimating lens;

a projection screen for displaying the image;

a varifocal projection lens system including a positive power lens and a negative power lens, each of the power lenses being provided with a center point and a corresponding focal point, the varifocal projection lens system having a focal length when the center points of the power lenses are separated by a distance, wherein the focussing lens is used for focussing the light beams emanating from the light source along a first optical path onto the reflective surfaces of the optical baffle located on its focal point; the reflective surfaces of the optical baffle for reflecting and diverging the light beams along a second optical path; the collimating lens for collimating the reflected beams from the reflective surfaces of the optical baffle to thereby illuminate the collimated beams uniformly onto each of the mirrors in the array of M×N actuated mirrors; each of the mirrors in the array of M×N actuated mirrors for reflecting the collimated light beams from the collimating lens and also causing a deviation in the optical path thereof reflected from each of the mirrors in the array of M×N actuated mirrors by changing its relative position to the collimated light beams in response to an electrical signal applied to the corresponding actuator; the collimating lens for refocussing the reflected light beams from each of the mirrors in the array of M×N actuated mirrors onto the reflective surfaces and slits of the optical baffle to thereby allow the optical baffle to modulate the intensity of the light beams; the varifocal projection lens for focussing onto the projection screen the modulated light beams from the optical modulator at a varying focal length by changing the distance between the center points of the positive and negative power lenses to thereby allow said optical system to display the image of M×N pixels in various sizes.

2. The optical projection system of claim 1, wherein the varifocal projection lens system includes a plurality of positive and negative power lenses.

\* \* \* \* \*